PATENT 3,235,409
Patented Feb. 15, 1966

3,235,409
IRRADIATED BATTERY SEPARATOR MEMBRANES
George K. Greminger, Jr., and Garth H. Beaver, both of Midland, Mich., assignors to The Dow Chemical Company, Midland, Mich., a corporation of Delaware
No Drawing. Filed July 14, 1961, Ser. No. 123,995
2 Claims. (Cl. 136—146)

The present invention concerns ion-permeable membranes that are advantageously adaptable for a variety of uses wherein the passage of ions through a water-insoluble but bibulous barrier is of interest. Particularly, the invention relates to membranes of certain water-soluble mixed cellulose ether derivatives insolubilized with high energy ionizing radiation.

In the prior art, A. A. Miller, in United States Letters Patent No. 2,895,891, teaches how water-soluble cellulose ethers can be cross-linked with high energy radiation in the presence of water to provide materials useful for fibers, tapes, fabrics, electrical insulation and the like.

It has now been discovered that certain mixed hydroxyalkyl methyl cellulose ethers in the form of an aqueous sol are cross-linked with controlled amounts of high energy ionizing radiation to provide water-insoluble, yet bibulous, membranes that are exceptionally useful in applications wherein ion permeability is of particular interest. One such application involves the use of such membranes in the construction of primary galvanic dry cells. The problems encountered in this art and the objects to be attained with improved separators for use in battery construction are set forth by N. C. Cahoon in United States Letters Patent No. 2,534,336.

In this reference, it is proposed to prepare separators from membranes of water-soluble alkyl cellulose ethers which have been either insolubilized with a polybasic acid or coated on an inert, water-insoluble but ion-permeable, supporting substrate to provide a composite separator stock.

Later teachings in the art are directed to improve separators prepared from specific alkyl cellulose ethers, e.g., methyl cellulose ethers (United States Letters Patent No. 2,551,799) and alkali-soluble methyl cellulose ethers containing from 10 to 20 percent methoxyl content (United States Letters Patent No. 2,900,433). As will be demonstrated in the following, the membranes of the present invention achieve a highly surprising improvement over other irradiated cellulose ethers and separators heretofore taught or suggested by the prior art.

In accordance with the invention, a superior ion-permeable, bibulous membrane is prepared by subjecting a layer of an aqueous sol or dispersion containing from about 1 up to about 50 percent by weight of certain hydroxyalkyl methyl cellulose ethers to a dose of high energy radiation of from about 0.25 up to 5 megarads. The wet bibulous layer thus treated can be utilized for an ion-permeable but water-insoluble membrane as produced or it can be subsequently dried at moderate temperatures for more convenient handling and manipulation. Upon rewetting, the dried hydrophilic layer can absorb several times its weight of water to provide an ion-permeable membrane comparable to that initially obtained upon irradiation of the sol.

Operable cellulose ethers have a hydroxyalkyl degree of substitution (D.S.) for each glucose residue moiety of about 0.05 and about 0.5 and a methyl degree of substitution for each glucose residue moiety of about 0.9 to about 2. The hydroxyalkyl groups contain from 2 to 4 carbons.

If necessary, the pH of the sol is adjusted to within the range of about 2 to about 8 prior to being irradiated. The preferred pH range during irradiation is from about 3 to about 6.

Ionizing radiation that can be employed in the practice of the present invention may range from about 50,000 up to 20,000,000 electron volts or more depending upon the thickness of the sol layer and the concentration of the cellulose ether therein. The dosage employed is specified in millions of rads. A rad is defined as 100 ergs of radiation energy absorbed per gram of material exposed. Examples of sources for such radiation are neutrons or mixed neutron and gamma radiation such as can be obtained in atomic reactors. Preferably, from the standpoint of convenience of operation, the high energy ionizing radiation source is an electron accelerating device. Ordinarily when employing high energy electrons, the dosage rate is expressed as beam current amperage. In the practice of the invention, beam currents in the range from 25 to 5,000 microamperes can be employed.

Membranes of any practicable shape or thickness up to several inches can be prepared in accordance with the invention. The particular needs of the application for such membranes under consideration will determine the effective and optimum thicknesses. The actual thickness of the membrane, dry or wet, will be determined in part by the concentration of the cellulose ether in the sol employed and the extent to which such sol is irradiated.

The layers of the aqueous sol are formed by any convenient means. The actual forming operation that may be employed most effectively with any particular sol is, to some extent, dependent upon the amount of cellulose ether solids present in the sol. With lower amounts, say from about 1 up to 20 percent by weight of the cellulose ether, the forming of the layers to be irradiated is effectively accomplished by casting a film on an inert supporting surface of any desired shape. Sols that contain larger amounts of the cellulose ether solids are sufficiently viscous or thick that they can be extruded to provide a layer in any continuous shape. When employed as battery separators, the membranes should have, for effective operation, a uniform thickness in the dry state within the range from about 1 up to 4 mils.

While the irradiated membranes of the invention are usually employed as the sole component of the battery separator, it is possible to prepare such membranes on an ion-permeable, water-insoluble support backing. For example, a two component separator is prepared by calendering or coating a thin paper support with the aqueous sol as described above and thereafter subjecting the coated support to high energy radiation in the manner that the sol alone would be irradiated.

In a representative operation illustrative of the invention, a water dispersion containing 7 percent by weight of a hydroxypropyl methyl cellulose ether having a methoxyl degree of substitution within the range from 1.68 to 1.82 and a hydroxypropyl degree of substitution within the range from 0.17 to 0.3 was prepared with the conventional hot and cold water technique. The dry cellulose ether powder was first mixed with about 0.2 of the required amount of water at a temperature of about 85° C. and after thus wetting the powder, the remainder of the required water was added as cold water. The pH of the sol was adjusted to 5.0 with a small amount of hydrochloric acid. The aqueous sol was then centrifuged in order to remove any air bubbles and the resulting clear sol was cast into a 35 mil layer on a flat stainless steel plate. This layer was irradiated with a 2 mev. (million electron-volt) electron beam supplied from a Van de Graaff accelerator having a total power capacity of 0.5 kilowatt. The beam current employed was 225 microamperes and the total dose applied was 1.5 megarads.

Subsequently, the irradiated layer was dried under ambient room conditions and removed from the stainless steel plate. The dry membrane thus prepared was 1.5 mils thick.

A second membrane was prepared in an identical manner except that the radiation dose utilized was 3.0 megarads.

The above-prepared bibulous membranes were cut into suitable shapes and incorporated into newly fabricated galvanic cells as separators between the electrolytic paste and soluble metallic anode. Standard zinc cans and carbon rods were employed for the anode and cathode, respectively. The electrolytic paste contained 2 parts by weight of an electrolyte and 5 parts by weight of a depolarizer mix. The electrolyte consisted of an aqueous solution containing 150 grams per liter of ammonium chloride, 90 grams per liter of zinc chloride and 0.5 gram per liter of mercuric chloride. The depolarizer mix consisted of 86 percent by weight manganese oxide, 4.2 percent by weight ammonium chloride and 9.8 percent by weight carbon black.

The assembled batteries were tested by discharging them 5 minutes per day in a circuit having an impedance of 4 ohms. Assuming a 0.75 volt cut-off point as determining the useful life of a cell, the lives of the batteries were thus ascertained. The battery that contained the separator that had been treated with 1.5 megarads had a useful life of 372 minutes. The battery having a separator of the second prepared membrane had a useful life of 325 minutes.

In other operations similar to those of the foregoing, additional batteries were prepared wherein the separators were of kraft paper and commercial battery separator paper. The useful lives of otherwise identical batteries prepared with each of the above separator membranes were ascertained in accordance with the above test procedures. Batteries prepared with the kraft and commercial battery papers had lives of 17 and 195 minutes, respectively.

Additional batteries were prepared in identical manner to that above except that the battery separator employed was a membrane obtained by irradiating a 7 percent aqueous sol of a methyl cellulose ether. A 2 percent aqueous solution of the methyl cellulose ether exhibited a viscosity of 25 centipoises at 20° C. Different radiation dosages were employed ranging from 1.25 up to 3 megarads with the thickness of the dried irradiated film varying from 1 to 2 mils. The maximum battery life achieved with the separators thus prepared was 272 minutes.

In a manner similar to that of the foregoing, other hydroxyalkyl methyl cellulose ethers such as water-soluble hydroxybutyl methyl cellulose ethers and hydroxyethyl methyl cellulose ethers can be employed in place of the above hydroxypropyl methyl cellulose ethers to achieve comparable results. Likewise, similarly improved results are achieved when magnesium can anodes are substituted for the zinc cans employed above.

What is claimed is:

1. A primary galvanic dry cell comprising a soluble metallic anode, an insoluble cathods, a depolarizer mix, an electrolyte and a separator between said soluble metallic anode and said deploarizer mix, said separator being composed of a water-insoluble, bibulous membrane having a thickness from about 1 up to about 4 mils prepared by subjecting a layer of an aqueous sol having a pH within the range from about 2 to about 8 and containing from about 1 up to 50 percent by weight of a hydroxyalkyl methyl cellulose ether wherein the hydroxyalkyl group contains from 2 to 4 carbon atoms and the ether is characterized by a hydroxyalkyl degree of substitution for each glucose residue moiety from about 0.05 to about 0.5 and methyl degree of substitution for each glucose residue moiety from about 0.9 to about 2 to a dose of high energy ionizing radiation of from about 0.25 up to 5 megarads.

2. A primary galvanic dry cell comprising a soluble metallic anode, an insoluble cathode, a depolarizer mix, an electrolyte and a separator between said soluble metallic anode and said depolarizer mix, said separator being composed of a water-insoluble, bibulous, composite membrane prepared by coating an ion-permeable water-insoluble support with an aqueous sol having a pH from about 2 up to about 8 and containing from about 1 up to about 50 percent by weight of hydroxyalkyl methyl cellulose ether wherein the hydroxyalkyl groups contain from 2 to 4 carbon atoms and the ether is characterized by a hydroxyalkyl degree of substitution for each glucose residue moiety of about 0.05 to about 0.5 and a methyl degree of substitution for each glucose residue moiety of about 0.9 to about 2, and thereafter subjecting the composite to a dose of high energy ionizing radiation of from about 0.25 up to about 5 megarads.

References Cited by the Examiner

UNITED STATES PATENTS

| | | | |
|---|---|---|---|
| 2,882,331 | 4/1959 | Zenczak | 136—146 |
| 2,895,891 | 7/1959 | Miller | 204—154 |
| 2,942,057 | 6/1960 | Huber et al. | 136—146 |

WINSTON A. DOUGLAS, *Primary Examiner.*

JOHN R. SPECK, JOHN H. MACK, *Examiners.*